(12) United States Patent
Laux et al.

(10) Patent No.: US 6,481,787 B1
(45) Date of Patent: Nov. 19, 2002

(54) MOTOR VEHICLE ROOF WITH TWO COVERS AND TWO HEAD LINER PARTS

(75) Inventors: Philip Laux, München (DE); Bernd Schleicher, München (DE); Thomas Kraus, Gauting (DE); Matthias Katzmeier, Klosterlechfeld (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/698,141

(22) Filed: Oct. 30, 2000

(30) Foreign Application Priority Data

Oct. 29, 1999 (DE) .......................... 199 52 317

(51) Int. Cl.⁷ ............................. B60J 7/047; B60J 7/057
(52) U.S. Cl. ..................................................... 296/214
(58) Field of Search ............................. 296/214, 220.01

(56) References Cited

U.S. PATENT DOCUMENTS

| | | | |
|---|---|---|---|
| 4,179,156 A | * 12/1979 | Huisman | 296/214 |
| 4,671,564 A | * 6/1987 | Sumida et al. | 296/214 |
| 4,844,534 A | * 7/1989 | Boots | 296/214 |
| 4,981,290 A | * 1/1991 | Huyer | 296/214 |
| 6,056,352 A | * 5/2000 | Ewing et al. | 296/220.01 X |

FOREIGN PATENT DOCUMENTS

| | | | |
|---|---|---|---|
| DE | 41 11 931 | 5/1992 | |
| DE | 4221043 | * 1/1993 | 296/214 |
| DE | 4141283 | * 6/1993 | 296/214 |
| DE | 44 38 104 | 12/1995 | |
| EP | 0 980 777 | 2/2000 | |

* cited by examiner

*Primary Examiner*—Dennis H. Pedder
(74) *Attorney, Agent, or Firm*—Nixon Peabody LLP; David S. Safran

(57) ABSTRACT

A sliding motor vehicle roof with two rigid covers (10, 11) for closing and at least partially exposing a roof opening (12) which is bordered by the roof frame in the fixed roof surface (13), with an displacement means for the ventilation position of the two covers (10, 11), and with a head liner which has a front and a rear headliner part (14, 15) and which can be moved at least partially independently of the cover position in the direction of the lengthwise axis of the motor vehicle by the displacement means. It is provided that, in order to produce the front horizontal ventilation gap (16) in front of the front edge of the front headliner part (14) and the rear horizontal ventilation gap (17) between the two headliner parts (14, 15), the front headliner part (14) is coupled to the rear headliner part (15). The front headliner part (14) can be moved from the closed position into the position which opens the front ventilation gap (16), and the rear headliner part (15) can be moved away from the front headliner part (14) by the ventilation position motion of the cover (10, 11) to clear the rear ventilation gap (17).

6 Claims, 2 Drawing Sheets

MOTOR VEHICLE ROOF WITH TWO COVERS AND TWO HEAD LINER PARTS

BACKGROUND OF THE INVENTION

1. Field of the Invention

The invention relates to a sliding motor vehicle roof with two rigid covers for closing and at least partially exposing a roof opening which is bordered by the roof frame in a fixed roof surface, with a displacement device for moving the covers into a ventilation position, and with a headliner which has a front and a rear headliner part and which can be moved at least partially independently of the cover position in the direction of the lengthwise axis of the motor vehicle.

2. Description of Related Art

A sliding motor vehicle roof of the initially mentioned type is known, for example, from German Patent DE 44 38 104 C1. This known sliding motor vehicle roof calls for the two sliding headliner parts to lie at least roughly at the same height in the closed position and to have the capacity to be pushed on top of one another for opening. The two sliding headliner parts are connected on both sides to headliner sliders which, for their part, each engage a roof-mounted restraint which extends in the lengthwise direction of the motor vehicle for control of the displacement motion of the two sliding headliners and for controlling the vertical displacement motion of the two sliding headliners. There is no separate adjustment of the two sliding roof parts.

German Patent DE 41 283 C2 discloses a sliding motor vehicle roof with a single rigid cover and two sliding headliner parts. In the raised ventilation position of the single cover, a horizontal ventilation gap can be produced between the headliner parts. To produce this ventilation gap, there is a coupling of the drive for raising the sole cover with the rear headliner part which is connected by spring loading to the front headliner part and can be moved by a roof-mounted control lever, such that the rear headliner part can be moved away from the front headliner part against spring loading to produce the ventilation gap between the headliner parts in the lengthwise direction.

SUMMARY OF THE INVENTION

The primary object of the present invention is to improve the ventilation situation in the sliding motor vehicle roof under discussion with simple means.

This object is achieved by the front headliner part being coupled to the rear headliner part so that, proceeding from the closed position of the front headliner part, the front headliner part can be moved into a position which produces a front ventilation gap in front of the front edge of the front headliner part and the rear headliner part can be moved away from the front headliner part by the ventilation position motion of the cover to produce a rear ventilation gap between the two headliner parts.

Accordingly, in a sliding motor vehicle roof which has two rigid covers and two headliner parts, the invention calls for producing a first ventilation gap between the two headliner parts and another ventilation gap in front of the first headliner part. Via these two ventilation gaps and the two ventilation gaps obtained by raising the two covers, a sufficient amount of fresh air can flow into the passenger compartment when the vehicle is moving.

Advantageously, the motion of the headliners for exposing the ventilation gap is coupled to the ventilation position motion of the two covers. Advantageously, the two headliner parts adjoin one another under spring pre-tensioning and can be pushed in this position in the manner of a single headliner in the lengthwise direction of the motor vehicle. Between the two headliner parts, a ventilation gap can be produced by the rear headliner part being forcibly coupled to the adjustment device for raising the two covers such that, with the front headliner part stationary, the rear headliner part is pulled to the rear by the covers when the ventilation gap is being produced. The ventilation gap between the two headliner parts is produced preferably after the ventilation gap in front of the forward headliner part has already been formed by the two adjoining headliner parts being pushed to the rear by the common headliner drive, whereupon the separation of the rear headliner part from the front headliner part takes place as another ventilation gap is being produced by pulling back the rear headliner part.

The entire headliner for producing the front ventilation gap is moved either via the displacement means which is independent of the displacement means for the covers for the headliner or alternatively by entraining the front headliner part when the rear headliner part is pulled back by forced coupling with the cover displacement means, whereupon the front headliner part is fixed by a stop which can be inserted into the path of motion of this headliner part so that proceeding from the then fixed front headliner part the rear headliner part can be pulled back as the rear ventilation gap is being cleared.

In the following the invention is explained by way of example using the drawings.

DETAILED DESCRIPTION OF THE INVENTION

Figure 1A:
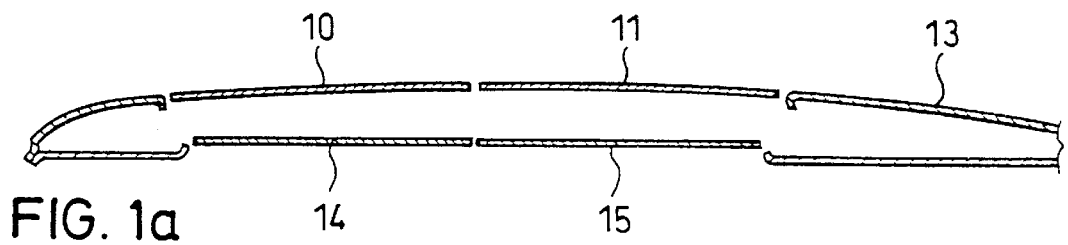
FIGS. 1a to 1d schematically show a sliding motor vehicle roof with two covers and two headliner parts in a closed position, a front ventilating position, a dual ventilating position and a fully open position, respectively.

FIGS. 1a to 1d schematically show a sliding motor vehicle roof with two rigid covers 10, 11 for closing and at least partially exposing a roof opening 12 which is bordered by 20 a roof frame (not shown) in the fixed roof surface 13. In addition, the sliding motor vehicle roof comprises a headliner having a front headliner part 14 and a rear headliner part 15.

Figure 1B:
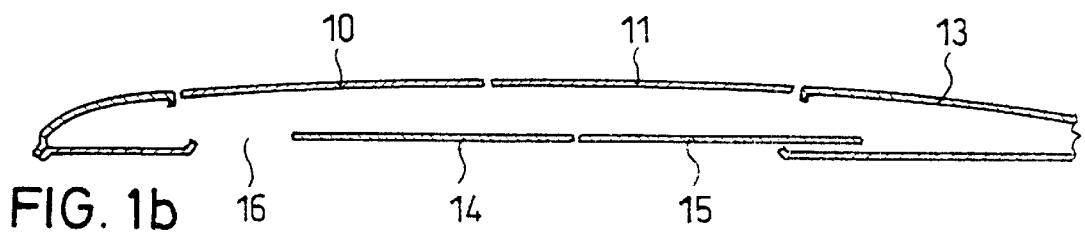

In FIG. 1a, the two covers 10, 11 are in the closed position within the roof opening 12 and the two headliner parts 14, 15 are likewise located in the closed position, the front headliner part 14 coming to rest essentially under the front cover 10 and the rear headliner part 15 coming to rest essentially under the rear cover 11. In this position, the covers 10, 11 and the headliner parts 14, 15 border one another. This means that rear edge of the front headliner part 14 borders the front edge of the rear headliner part 15. From these closed positions, the cover 10, 11 and the headliner parts 14, 15 can be moved into the fully open position which has completely exposed the roof opening and which is shown in FIG. 1d in schematic form. In the fully open position, the two covers 10, 11 are positioned obliquely in the manner of two spoiler covers, the front cover 10 coming to rest over and in front of the rear cover 11, while the two headliner parts 14, 15 come to rest on top of one another in the area of the rear edge 12 of the roof opening and essentially off set to the rear with reference to it. In the embodiment shown, the front headliner part 14 comes to rest in this position over the rear headliner part 15. Alternatively, the two headliner parts 14, 15 can also be pushed under the rear edge of the roof opening 12 lying in succession one behind the other, similarly to the position shown in FIG. 1*a*.

Figure 1C:
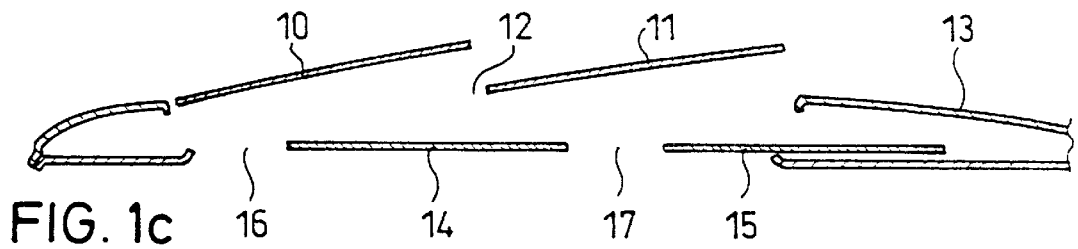
Figure 1D:

One an arrangement of the covers 10, 11 and the headliner parts 14, 15 in the ventilation position is schematically shown in FIG. 1*c*. Accordingly, the two covers 10, 11 are in a ventilation position in which they are each located sloped upwards at their rear edge having been pivoted around their front edge, and additionally, the back cover 11 being pushed slightly to the rear. By means of these inclined positions of the covers 10, 11, a front horizontal ventilation gap is established between the covers 10, 11 and a rear horizontal ventilation gap is established between the edge of the back cover 11 and the fixed roof surface 13. Analogously to the coverside horizontal ventilation gaps, in FIG. 1*c*, the headliner is also in the ventilation position. This means that the headliner parts 14, 15, proceeding from the closed position of the headliner shown in FIG. 1*a*, at a mutual distance and at a distance with respect to the front edge of the roof opening 12, are pushed to the rear such that a front horizontal ventilation gap 16 is formed, between the front edge of the front headliner part 14 and the front edge of the roof opening 12, while a rear horizontal ventilation gap 17 is formed between the rear edge of the front headliner part 14 and the front edge of the rear headliner part 15.

FIG. 1*b* shows an intermediate position of the headliner between the closed position of FIG. 1*a* and the ventilation position of FIG. 1*c*. Accordingly, in this embodiment, first the front ventilation gap 16 is produced by pushing the adjoining headliner parts 14, 15 jointly to the rear, whereupon, as follows from FIG. 1*c*, with the front headliner part 14 stationary, the rear headliner part 15 is pushed to the rear as the rear ventilation gap 17 alone is produced. The latter exclusive displacement of the rear headliner part is preferably coupled to the raising motion of the cover 10, 11.

Figure 2:
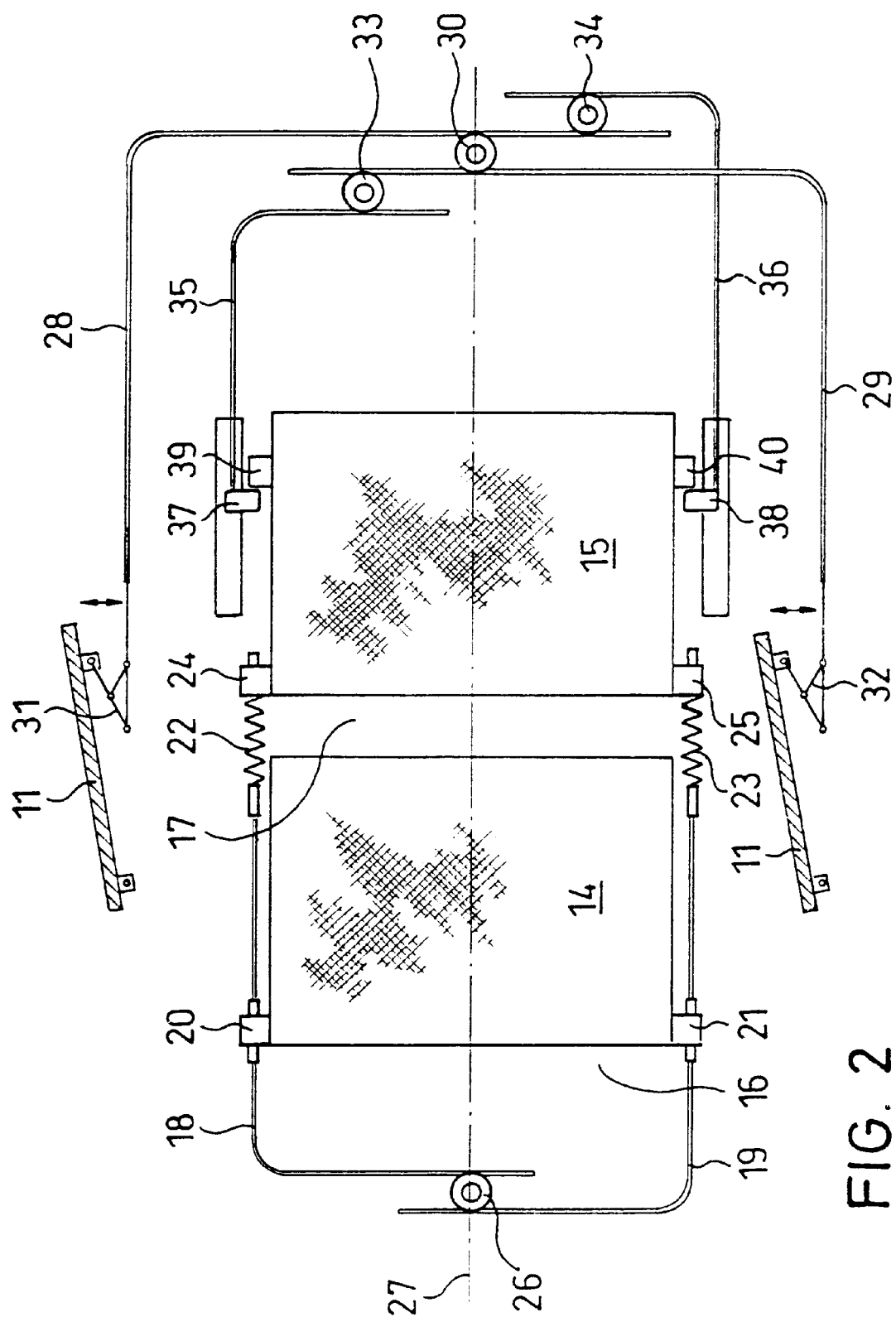
FIG. 2 schematically shows a drive coupling between the two rigid covers and the two headliner parts for producing two ventilation gaps in the headliner area.

Producing the ventilation gaps 16, 17 in the area of the headliner in conjunction with the raising motion of the covers 10, 11 is produced by a displacement means shown in FIG. 2 by way of example.

As shown in FIG. 2, there is a common displacement means for the two headliner parts 14, 15, independently of the cover 10, 11, which displacement means comprises two drive cables 18, 19 which are securely joined via lateral projections 20, 21 to the front edge of the front headliner part 14, which run in the conventional manner in guides, and which extend into the area of the rear edge of the front headliner part 14. To the back ends of the drive cables 18, 19, tension springs 22, 23 are securely connected and their other ends are securely connected to the projections 24, 25 on the front edge of the rear headliner part 15. By means of the tension springs 22, 23, the front edge of the rear headliner part 15 is normally pre-tensioned against the rear edge of the front headliner part 14 so that these two headliner parts 14, 15, in this position, a form a continuous headliner. FIG. 2 shows the spaced position of the two headliner parts 14, 15 in which the tension springs 22, 23 are stretched and the two headliner parts 14, 15 produce the rear ventilation gap 17.

The front ends of the drive cables 18, 19 are drive-engaged with a drive wheel 26 which can be actuated in a manner which is not shown, preferably by means of an electric motor, in order to effect joint displacement of the headliner parts 14, 15. The drive wheel 26 preferably has its axis of rotation on the lengthwise center axis 27 of the headliner parts 14, 15.

Similarly to the lengthwise displacement of the headliner parts 14, 15, the raising motion of the covers 10, 11 into their ventilation position is effected by an electric motor drive which acts on the drive cable 28, 29. FIG. 2 shows, for the sake of clarity, the corresponding drive solely for the rear cover 11. The drive for the front cover 10 is made analogously to this drive and calls for a lengthening of the corresponding drive cables.

Accordingly, the drive for the rear cover 11 comprises two drive cables 28, 29 which are drive-connected to a drive wheel 30 lying on the lengthwise center axis 27 and which actuate the raising mechanism 31, 32 for the rear cover 11 in FIG. 2. Other drive wheels 33, 34 are engaged with the drive cables 28, 29, and for their part, via the drive cables 35, 36 drive link drivers 37, 38, which are securely connected to the drive cables 35, 36 and are guided on either side of the rear headliner part 15 in the links. The link drivers 37, 38 are designed to engage projections 39, 40 which are located on the rear edge of the rear headliner part 15 on either side of it and are securely joined to them. The link drivers 37, 38 lie in front of the projections 39, 40 and are used to push the rear headliner part 15 to the rear relative to the stationary front cover part 14 as the rear ventilation gap 17 is formed, by engaging the projections 39, 40 coupled to the raising motion of the covers, of which FIG. 2 shows only the rear cover 11 and its drive.

In the embodiment shown in FIG. 2, to produce the ventilation gaps 16, 17 in the head liner area first with the covers 10, 11 closed the front head liner part 14 jointly with the rear head liner part adjoining it flush is pushed to the rear by means of the drive 18, 19, 26 as the front ventilation gap 16 is cleared between the front edge of the front head liner part 14 and the front edge of the roof opening 12. Thereupon the drive 18, 19, 26 is stopped and thus the front head liner part 14 is held stationary in its position which clears the front ventilation gap 16. At this point the covers 10, 11 are raised by means of the drive 28 to 32, by which via the drive 33 to 40 the rear head liner part 15 is pulled to the rear against the spring force of the tension springs 22 to the rear from the front head liner part 14 as the rear ventilation gap 17 is cleared. At this point, air is allocated to the row of seats via the horizontal ventilation gaps between the covers 10, 11 and the front edge of the front cover 10 and the ventilation gaps 16, 17 between the two head liner parts 14, 15 and on the front edge of the front head liner part 14 as the vehicle is driving.

The covers 10, 11 and the headliner parts 14, 15 are closed as the ventilation gaps are closed in the reverse sequence by first lowering the covers 10, 11 (and if necessary, moved forward), in doing so, the rear headliner part 15 being entrained to make contact against the front headliner part 14 by the tension springs 22, 23, whereupon the two adjoining headliner parts 14, 15 are moved forward jointly into their closed position.

The headliner can be coupled to the two-part cover to produce ventilation gaps in an altered form. Thus, for example, it is possible to form the ventilation gaps in the headliner area without activating the common displacement drive for the headliner parts by pulling the two headliner parts 14, 15 to the rear via the raising motion of the covers 10, 11. As a result, the headliner parts which adjoin one another are moved together as the front ventilation gap 16 is being formed, the front headliner part 14 stopping as soon as the front ventilation gap 16 is produced, coming to rest against stops (not shown) and which project into the path of motion of the front headliner part 14, so that further pulling on the rear headliner part during the raising motion of the covers 10, 11 separates the rear headliner part 15 from the front headliner part 14 against the force of the tension springs 22, 23 as the rear ventilation gap 17 is being formed. To close the ventilation gaps 16 and 17, the indicated actuation sequence takes place in the reverse direction, the stops for fixing the front headliner part 14 then being pulled in again. These stops are then also pulled in again and allow joint motion of the two headliner parts 14, 15 when they are moved into the position shown in FIG. 1d to completely expose the roof opening 12. Preferably, these stops are likewise forcibly controlled by the raising-lowering motion of the two covers 10, 11. Instead of the tension springs 22, 23, as an equivalent, compression springs can also be used when the coupling of the drives to the headliner parts 14 and 15 is matched accordingly, so that the headliner parts are pressed apart by spring action for producing a rear ventilation gal) 17, and to close this ventilation gap 17, they are pushed together by one of the drives.

What is claimed is:

1. Sliding motor vehicle roof comprising:

a roof opening in a fixed roof surface;

two rigid covers for closing and at least partially exposing the roof opening in the fixed roof surface;

a headliner which has a front headliner part and a rear headliner part which are movable in a lengthwise direction of the motor vehicle;

means for producing a first ventilation position of the roof comprising a first displacement means for simultaneously displacing the front headliner part and the rear headliner part in a lengthwise direction of the roof from a closed position to an at least partially open position in which a front ventilation gap is produced between a front edge of the roof opening and a front edge of the front headliner part; and means for producing a second ventilation position of the roof comprising a second displacement means for simultaneously displacing the two covers and the rear headliner part in a direction away from the front headliner part into a position producing a rear ventilation gap between a rear edge of the front headliner part and a front edge of the rear headliner part in addition to said front ventilation gap, the front headliner part being held by said first displacement means during operation of said second displacement means.

2. Sliding motor vehicle roof as claimed in claim 1, wherein the rear headliner part is coupled to the two covers for producing the rear ventilation gap during movement of the covers into said second ventilation position.

3. Sliding motor vehicle roof as claimed in claim 2, wherein the rear headliner part is spring loaded by a spring against the front headliner part and is coupled to the second displacement means such that the rear headliner part is movable by the second displacement means away from the front headliner part against the spring load to produce the rear ventilation gap.

4. Sliding motor vehicle roof as claimed in claim 3, wherein the coupling of the rear headliner part to the second displacement means comprises link drivers actuated by the second displacement means and engageable with side driving elements on the rear headliner part.

5. Sliding motor vehicle roof as claimed in claim 1, wherein the rear headliner part is spring loaded by a spring against the front headliner part and is coupled to the cover displacement means such that the rear headliner part is movable by the second displacement means away from the front headliner part against the spring load to produce the rear ventilation gap.

6. Sliding motor vehicle roof as claimed in claim 5, wherein the coupling of the rear headliner part to the second displacement means comprises link drivers actuated by the second displacement means and engageable with side driving elements on the rear headliner part.

* * * * *